3,197,971
PROCESS FOR STORING OZONE

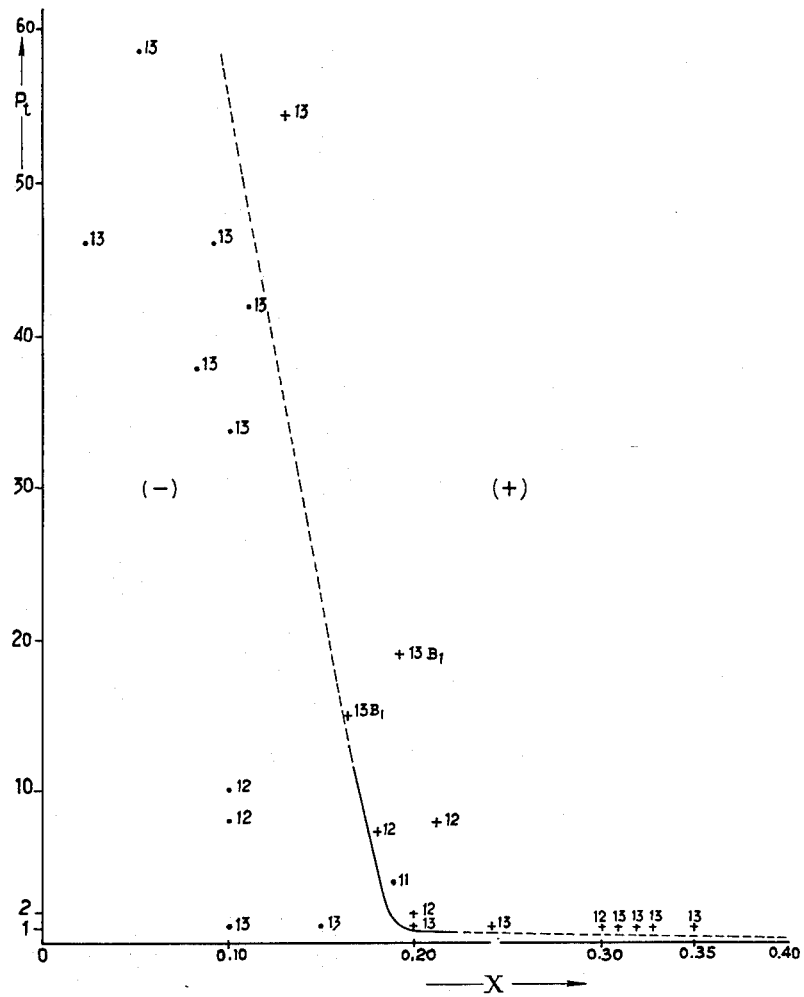

Francis Mahieux, Gennevilliers, France, assignor to L'Air Liquide, Societe Anonyme pour l'Etude et l'Exploitation des Procedes Georges Claude
Filed Sept. 25, 1963, Ser. No. 311,352
Claims priority, application France, Oct. 10, 1960, 840,697, Patent 1,246,273
1 Claim. (Cl. 62—48)

The present application is a continuation-in-part of application Serial Number 141,017, filed September 27, 1961, now abandoned.

This invention relates to a process for storing ozone under safe conditions at room temperature in a vessel, by separating ozone from an ozone-containing gas mixture by dissolving it in a liquid halogenated fluorine-containing methane at a temperature so low that the partial pressure of ozone is below its explosion limit, as disclosed in French Patent No. 1,246,273 of October 6, 1959, then closing said vessel and allowing the temperature of the solution to rise to room temperature.

The stability of the ozone thus stored in a closed vessel under pressure remains very good and enables it to be preserved for at least several days. The temperature rise produces an at least partial evaporation of the dissolved gas from its solvent. It forms two phases in the receptacle under pressure. The liquid phase comprises the solvent in the liquid state and gas which remained in solution therein. The gas phase comprises the solvent under its vapor pressure at ambient temperature, and ozone gas in equilibrium with ozone which has remained in the solution.

The vapor pressure at ambient temperature of the solvent may vary in accordance with its nature between less than one atmosphere and several tens of atmospheres. More especially at 20° C. in the case of fluorochloromethanes, which may be employed as solvents for ozone and which will hereinafter be referred to under the usual trademark "Freons," it is 0.84 atmosphere in the case of "Freon 11" (monofluorotrichloromethane), 5.43 atmospheres in the case of "Freon 12" (difluoro-dichloromethane), 9.2 atmospheres in the case of "Freon 22" (monochlorodifluoromethane), and 30.6 atmospheres in the case of "Freon 13" (monochlorotrifluoromethane).

The partial pressure of the ozone in the vapor phase varies with its content in the solvent, but it may reach several atmospheres, which result was hitherto unobtainable by reason of the instability of this gas under the usual conditions.

The receptacle for the preservation of the ozone solution must be free, on its inside surface, of any material which could catalyze the decomposition of the ozone. The solution is preferably kept in a glass or aluminum receptacle. Other metals, such as steel, stainless steels, and copper, may also be employed, but on condition that they are provided with an internal coating of glass, enamel or polytetrafluoroethylene or "Teflon." Some plastic materials, such as polyethylene or polyvinyl chloride are also suitable.

The explosive gas preserved in a receptacle completely free from impurities which may catalyze this decomposition decomposes only very slowly. For example, after dissolution of ozone in difluoromonochloromethane in a concentration such that its partial pressure reaches 5 atmospheres at ambient temperature in a glass vessel, its concentration remains equal to 50% of the initial value after storage for one week. The gradual pressure increase set up by the decomposition of the explosive gas is also harmless, because total decomposition produces only a moderate pressure increase which is equal to one half of its initial partial pressure and is consequently of little importance.

At the time of use, the receptacle is opened and the gaseous mixture of solvent and ozone is withdrawn, if desired after expansion in a reducing valve.

If however the ozone is dissolved at low temperature in a halogenated fluorine-containing methane and the system is allowed to warm up to room temperature, without any special precautions, there is a risk of obtaining an explosive gas if the partial pressure of ozone in vapor phase reaches or exceeds the explosive limit pressure.

An object of the present invention is to avoid the aforementioned hazard of explosion. Another object is to allow the storage at room temperature of ozone solutions in a halogenated fluorine-containing methane which may contain ozone under partial pressures up to several atmospheres but do not exhibit any tendency to decompose explosively and are therefore perfectly safe.

According to the invention, there is dissolved in the liquid halogenated fluorine-containing methane such an amount of ozone that the ozone content of the gas phase after warming up to room temperature, expressed as a molar fraction, versus the total pressure inside the storage vessel, expressed in bars, is lower than the limit corresponding to the following table

| Ozone content: | Total pressure |
|---|---|
| 0.10 | 62 |
| 0.12 | 53 |
| 0.14 | 35 |
| 0.15 | 24 |
| 0.16 | 16 |
| 0.17 | 10 |
| 0.18 | 4.5 |
| 0.19 | 1.5 |
| 0.20 | 1.0 |
| 0.25 | 0.75 |
| 0.30 | 0.50 |

Experimental tests have shown that the gas phase alone affords risks of exploding, as it has generally a higher ozone content than the liquid phase, and is besides more sensitive to stimuli.

Explosion trials on cold solutions, between −150° C. and −180° C., containing dissolved ozone, with various igniting devices, such as immersing a lighted electric arc, or with sparks, or through the introduction of decomposition catalysts, have shown that such cold solutions were stable up to an ozone concentration equivalent to a molar fraction of 0.60.

Trials on the gas phase under atmospheric pressure at 20° C. have shown that the said phase allowed comparatively safe handling up to an ozone concentration equivalent to a molar fraction of about 0.40. However, sparks from discharging condensers can cause explosions down to a concentration equivalent to a molar fraction of 0.20; below that value the system cannot explode.

The limits of explosion of the gas phase of solutions of ozone in various halogenated fluorine-containing methanes have therefore been established through a thorough investigation, the mixture being ignited through the explosion of a platinum wire under the discharge of condensers at 2000 volts.

The table given hereunder gathers the data relating to the molar concentration X of the ozone, under the initial pressure of $P_i$ at 20° C., expressed in bars, and the maximum explosion pressure $P_M^E$, for various fluorinated hydrocarbons such as trifluorochloromethane $CF_3Cl$, difluorodichloromethane $CF_2Cl_2$, fluorotrichloromethane $CFCl_3$, trifluorobromomethane $CF_3$ brand difluoromonochloromethane $CHF_2Cl$.

The system cannot explode when $P_M^E/P_i = 1$.

| Fluoromethane | $CF_3Cl$ | | | | | | $CF_2Cl_2$ | | | | | | $CCl_3F$ | $CF_3Br$ | $CHF_2Cl$ |
|---|---|---|---|---|---|---|---|---|---|---|---|---|---|---|---|
| Pi | 1.00 | 34 | 38 | 41.5 | 46 | 53.5 | 1.00 | 7.8 | 8.0 | 8.4 | 10.0 | 11.0 | 4.0 | 15 | 18 | 1.00 |
| X | 0.35<br>0.30<br>0.20<br>0.15 | 0.10 | 0.08 | 0.11 | 0.09 | 0.13 | 0.38<br>0.30<br>0.25<br>0.20 | 0.18 | 0.10 | 0.21 | 0.10 | 0.15 | 0.19 | 0.16 | 0.19 | 0.26<br>0.20<br>0.14<br>0.10 |
| $P_M{}^E$ | 4.50<br>2.40<br>1.20<br>1.00 | 34 | 38 | 41.5 | 46 | 126 | 6.60<br>4.50<br>4.00<br>2.70 | 18.2 | 8.00 | 21.6 | 10.0 | 21.0 | 4.0 | 23.2 | 39 | 6.20<br>4.10<br>3.50<br>2.20 |
| $P_M{}^E/Pi$ | 4.50<br>2.40<br>1.20<br>1.00 | 1 | 1 | 1 | 1 | 2.36 | 6.60<br>4.50<br>4.00<br>2.70 | 2.43 | 1 | 2.57 | 1 | 1.91 | 1.0 | 1.55 | 2.17 | 6.20<br>4.10<br>3.50<br>2.20 |

From the table, one can deduce the following maximum safety limits of the total pressure for various ozone contents, and vice versa. Those limits are valid for any fluorochloro- or fluorobromomethane solvent.

| Ozone content: | Total pressure |
|---|---|
| 0.10 | 62 |
| 0.12 | 53 |
| 0.14 | 35 |
| 0.15 | 24 |
| 0.16 | 16 |
| 0.17 | 10 |
| 0.18 | 4.5 |
| 0.19 | 1.5 |
| 0.20 | 1.0 |
| 0.25 | 0.75 |
| 0.30 | 0.50 |

The limit can be graphically expressed by the curve of the appended drawing, separating the safe non-explosive area from the unsafe area. This curve shows the value of the total pressure $P_t$ inside the storage vessel, expressed in bars, and plotted as the ordinate, versus the ozone content X of the gas phase, expressed as a molar fraction and plotted as the abscissa.

The non-explosive area, at the left of the curve giving the explosion limit of the system, is shown by the negative sign (−), and the explosive area of the system is shown by the positive signs (+). The various points inside each area are provided with an index corresponding to a given halogenated fluorine-containing methane. Trifluorochloromethane is represented by 13, difluorodichloromethane by 12, trichlorofluoromethane by 11, and trifluorobromomethane by 13B₁.

From the investigation of this curve, it is deduced that the explosive limit can be neared, as the cases of explosions give a ratio between the maximum explosive pressure $P_M{}^E$ and the initial pressure at 20° C. $P_1$ lower than 5 ($P_M{}^E/P_i<5$).

With difluorodichloromethane, the maximum pressure after the explosion does not exceed 50 bars. In that case, the explosion affords no hazard.

The ozone content of the gas phase having been chosen, the coefficient of filling of the vessel may be determined.

The coefficient of filling is indicated by the ratio $V/v_1$, V being the volume of the vessel and $v_1$ the volume of the solvent at the low temperature of solubilizing T.

To compute the coefficient of filling $R=V/v_1$, it is necessary only to note that the partial pressure of the ozone must be lower than its explosive limit pressure.

The limit partial pressure of the ozone in the gas phase is computed through the following relation:

$$P_{O_3}{}^{\text{limit}} = X^{\text{limit}} P_t$$

The calculation makes it possible to establish the partial pressure of the ozone in the gas phase inside a vessel containing an ozone-fluorinated hydrocarbon mixture in equilibrium under pressure at room temperature.

If $v_2$ is the volume of fluorinated hydrocarbon remaining in the liquid state at 20° C. and V is the volume of the vessel, the volume of ozone in the gas phase (assuming as a first approximation, that ozone behaves like a perfect gas) is as follows:

$$P_{O_3}(V-v_2) \quad (1)$$

where $P_{O_3}$ is the partial pressure of the ozone at 20° C.

The volume of ozone in the gas phase is also the difference between the total initial volume of ozone in the low-temperature solution and the volume of ozone retained in the liquid phase at 20° C., i.e.:

$$S \cdot v_1 - (sp_{O_3} v_2) \quad (2)$$

where:

S is the volume of ozone gas, under normal conditions, liberated per unit volume of solvent at the low temperature of solubilization T (a conventional correction must be applied to get the volume of ozone at 20° C.);

$sp_{O_3}$ is the solubility (gas volume per unit liquid volume) at room temperature (20° C.) and under the partial pressure $P_{O_3}$;

$v_2$ is approximately equal to the volume of the solution at 20° C.

With the above approximations, relationships (1) and (2) are then equated:

$$P_{O_3}(V-v_2) = S \cdot v_1 - sp_{O_3} \cdot v_2 \quad (3)$$

$sp_{O_3}$ is known to be approximately equal to $s_1 P_{O_3}$, $s_1$ being the solubility at 20° C. under 1 bar of ozone.

Replacing $sp_{O_3}$ by that value, and knowing that $s_1$ is approximately 3.4 (cf. Mahieux, Bull. Soc. Chim. 1961, pp. 2275–2276), equation (3) becomes:

$$P_{O_3} \cong S \cdot v_1 / (V + 2.4 v_2)$$

S, $v_1$, V and $v_2$ having been measured, the value of $P_{O_3}$ is deduced. In actual fact, $s_1$ varies little from one fluorinated hydrocarbon to another.

Assuming that the initial ozone is not decomposed, the coefficient of filling R is derived from the above for the following three fluorochloromethanes:

In the case of fluorotrichloromethane, $CFCl_3$, $S=5$, hence $v_1<V/4$; if $V=1,000$ cc., $v_1=250$ cc., which means that in a volume V of one litre, 250 cc. of solution may be introduced at low temperature without risking an explosion.

For difluorodichloromethane, $CF_2Cl_2$, $S=30$, hence:

$$v_1 \leqq V/16.6$$

In a volume V of one litre, about 60 cc. may be introduced safely at low temperature.

For trifluorochloromethane, $CF_3Cl$, the calculation is more difficult, because the molecular volume of the gas under pressure diverges from Boyle's law.

If $S=55$, the total pressure $P_t$ reaches 50 bars, hence $v_1 \leqq V/14.3$. For $V=1$ litre, the maximum volume of the solvent at low temperature is then 70 cc.

Comparative studies have shown that the effective partial pressure of ozone is lower than the theoretical value. This significant difference stems from the fact that the solubility increases faster than the pressure, and from the significant initial decomposition.

Thus, in the above calculations, the theoretical pressure is higher than the effective pressure, about twice for fluorotrichloromethane; the volume of the solvent at low temperature becomes $v_1 \leq V/2$. For $V=1$ litre, $v_1$ thus reaches 500 cc.

For difluorodichloromethane and trifluorochloromethane, the theoretical pressure is 5 to 10 times greater than the effective pressure. With difluorodichloromethane, $v_1 \leq V/1.7$; if $V=1$ litre, $v_1$ is about 600 cc.; with trifluorochloromethane as the solvent, $v_1 \leq V/2$.

What I claim is:

A process for storing ozone under safe conditions at ambient temperature, by separating ozone from an ozone-containing gas mixture by dissolving it in a liquid halogenated fluorine-containing methane at a temperature so low that the partial pressure of ozone is below its explosion limit, introducing at about said low temperature the ozone solution into a pressure-resistant vessel, closing said vessel and allowing the temperature of the solution to rise to ambient temperature, wherein there is dissolved in the liquid halogenated fluorine-containing methane such an amount of ozone that the ozone content of the gas phase after warming up to ambient temperature, expressed as a molar fraction, versus the total pressure inside the storage vessel, expressed in bars, is lower than about the limit corresponding to the following table:

| Ozone content: | Total pressure |
|---|---|
| 0.10 | 62 |
| 0.12 | 53 |
| 0.14 | 35 |
| 0.15 | 24 |
| 0.16 | 16 |
| 0.17 | 10 |
| 0.18 | 4.5 |
| 0.19 | 1.5 |
| 0.20 | 1.0 |
| 0.25 | 0.75 |
| 0.30 | 0.50 |

References Cited by the Examiner

UNITED STATES PATENTS

| 2,876,077 | 3/59 | Haller. |
| 2,928,529 | 3/60 | Grosse et al. |
| 2,975,035 | 3/61 | Cook. |
| 2,992,540 | 7/61 | Grosse et al. _____ 62—48 |
| 3,008,902 | 11/61 | Cook. |

OTHER REFERENCES

Publication, Cook et al.: Industrial and Engineering Chemistry; vol. 48, No. 4, "Explosion Limits of Ozone-Oxygen Mixtures"—April 1965, pages 736–744.

ROBERT A. O'LEARY, *Primary Examiner.*